Dec. 26, 1961  A. RICHTER  3,014,420
SAFETY DEVICE FOR USE IN ECCENTRIC PRESSES AND CRANK PRESSES
Filed Aug. 4, 1959  2 Sheets-Sheet 1

INVENTOR
ADAM RICHTER
BY

ATTORNEY

Dec. 26, 1961 A. RICHTER 3,014,420
SAFETY DEVICE FOR USE IN ECCENTRIC PRESSES AND CRANK PRESSES
Filed Aug. 4, 1959 2 Sheets-Sheet 2
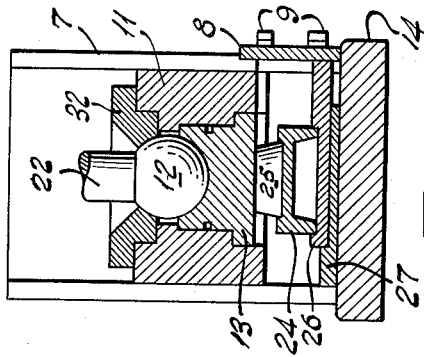
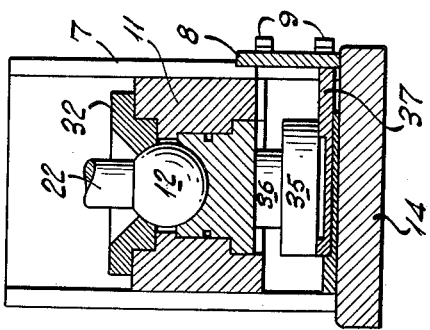
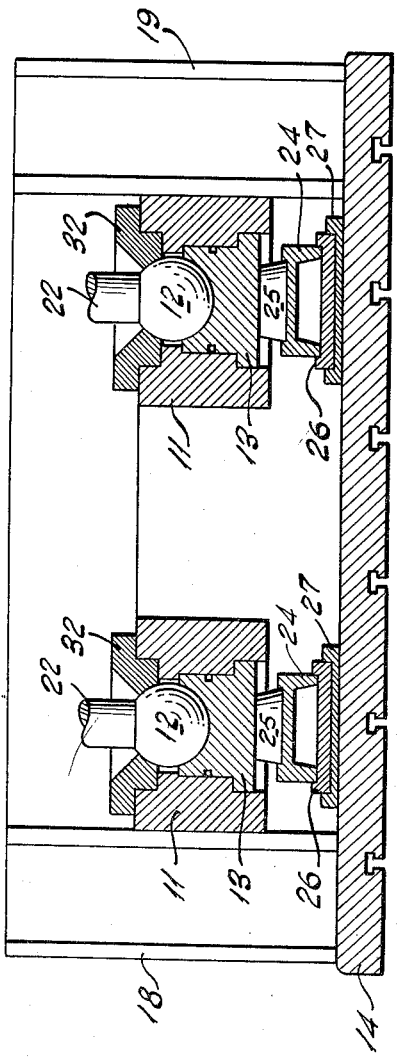
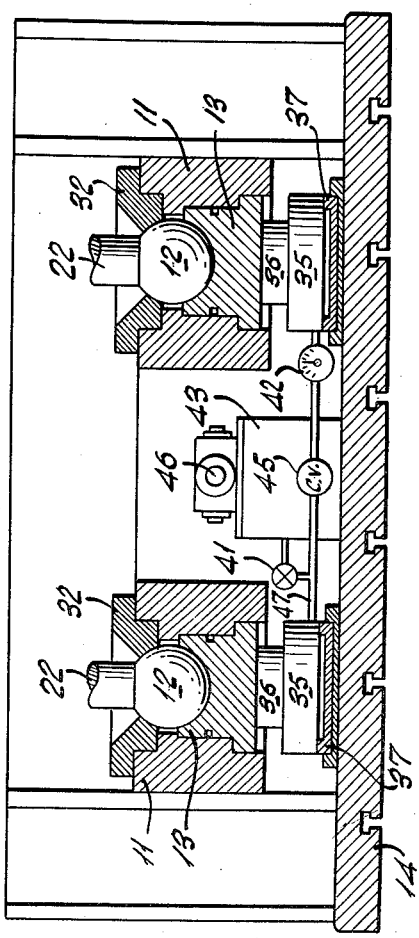
INVENTOR
ADAM RICHTER
BY
ATTORNEY United States Patent Office 3,014,420
Patented Dec. 26, 1961

3,014,420
SAFETY DEVICE FOR USE IN ECCENTRIC
PRESSES AND CRANK PRESSES
Adam Richter, Lohfelden, near Kassel, Germany
Filed Aug. 4, 1959, Ser. No. 831,630
Claims priority, application Germany Mar. 22, 1955
3 Claims. (Cl. 100—53)

The present invention relates to a safety device for the use in power presses. This is a continuation-in-part of my copending application Serial No. 572,760 filed Mar. 20, 1956 now abandoned.

The safety devices hitherto used in power presses are of two different types: They are either based on mechanical or on hydraulic principles.

As regards the safety devices of the first group, they consist essentially of an auxiliary part or parts, e.g., a safety plate or plates which upon overloading of the press are shattered into many fragments. Each time this happens, the broken pieces have to be removed and a new safety plate or plates will have to be provided to replace the old ones.

The use of such safety plates is uneconomical, not only because the plates, which are quite expensive, can only be used once, but also because the replacement of broken plates has sometimes to take place several times a day, thereby causing interruption of work with loss of time and expense for additional labor.

On the other hand, the safety devices comprising breakable plates have the advantage that they can be inserted as a unit in the empty space provided for that purpose in eccentric or crank-operated presses, without necessitating changes of design or re-building of the presses.

The safety devices of the second group based on hydraulic principles use a cylinder-piston assembly and a pressure fluid therein for transmission of pressure, and they provide an overflow valve through which fluid is discharged to a supply tank in case of an overload occurring in the press. The hydraulic type of safety device has the advantage that there is no wear and tear of parts. However, up to now, this type of safety device was made integrally with parts of the press, e.g., the piston movable in the cylinder of the safety device forms a socket to receive the ball pivot of the lower end of the press ram; the cylinder itself is integrally formed with another part of the press. Such a safety device is, therefore, specific to the press to which it is applied. It can only be removed or applied by rebuilding the machine. Each type of press needs a safety device particularly designed therefor. Consequently, presses with this type of safety device are very expensive and are not widely used.

It is an object of the present invention to provide a safety device for power presses which combines the advantages of both types of safety devices while avoiding the shortcomings inherent in each type.

It is a further object of the invention to provide a safety device for power presses, more particularly of the eccentric and crank-operated type, which may be inserted as a unit without requiring any change of construction or any rebuilding of the presses, and which can, therefore, be used alternatively with the breaking plates customarily employed in such presses.

It is another object of the invention to provide a safety device for power presses which is not subjected to wear and tear.

It is a further object of the invention to provide a safety device for power presses which may be used again after it has been rendered active in response to overload.

It is another object of the invention to provide a safety device for power presses which may be readily reset for use, after it has become active for avoiding an overload in the press.

Other objects and advantages of the invention will become apparent from the following description when read in conjunction with the accompanying drawings.

The safety device according to the invention, consists of an aggregate comprising a number of hydraulic elements, known per se, which together form a complete unit that may be inserted into any existing power press having a reciprocating ram and a movable tool-holder associated therewith; as mentioned before, the safety device is particularly useful for application in eccentric presses and crank presses.

Generally speaking, the safety device comprises a high-pressure cylinder which is closed at one end, a piston slidably mounted in the cylinder, and a hydraulic fluid in the cylinder between the closed end and the piston. A conduit which leads off the cylinder conveys hydraulic fluid to a storage tank. In the conduit an overflow valve is provided which becomes operative for the passage of the hydraulic fluid from the cylinder to the tank when the pressure in the cylinder reaches a predetermined value. It is an essential feature of the device according to the invention that the closed end of the cylinder and the outer end of the piston have mutually opposed parallel surfaces which make it possible to insert the safety device as a unit into the power press between the reciprocating drive member and hte slidably mounted tool-holder, without the press having to undergo structural changes of any kind.

If this should be desirable for some particular reason, it is also possible to take out the new safety unit and put in one of the old-type breakable plates.

The press and the safety device according to the invention will be more fully described with reference to the accompanying drawing, in which:

FIG. 2 illustrates a safety device of a type known in the art, with breakable plate, in longitudinal section;

FIG. 3 is a section through the same type of safety device taken at an angle of 90° with respect to FIG. 2; and FIGS. 4 and 5 illustrate in views similar to FIGS. 2 and 3, respectively, an embodiment of the safety device according to the present invention.

Figure 1:
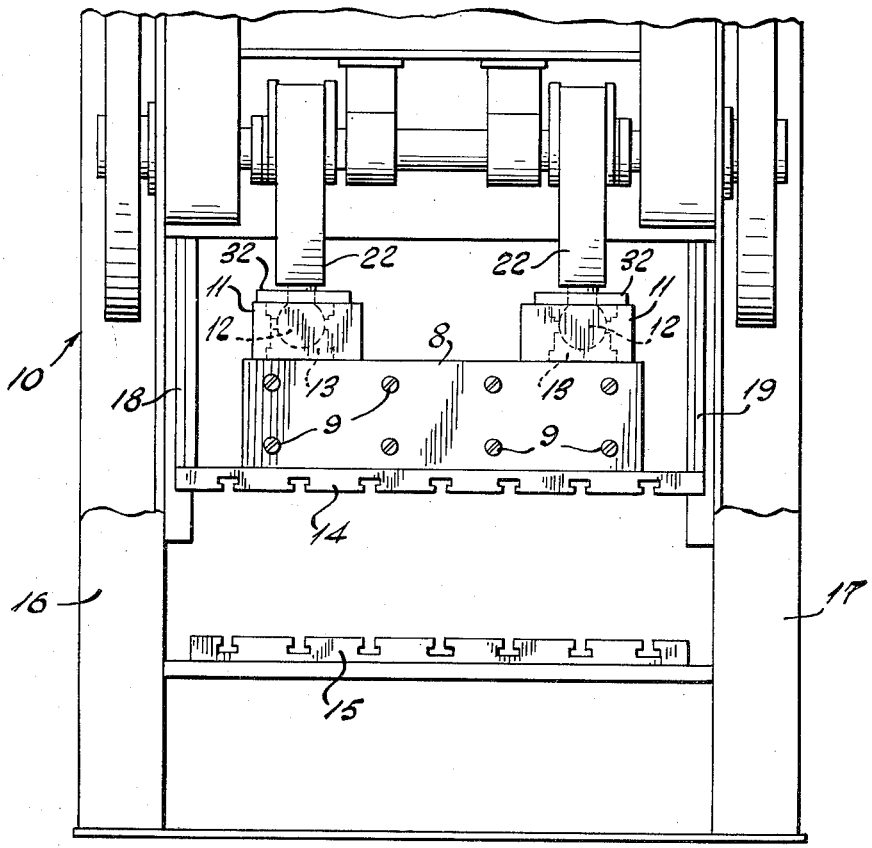
FIG. 1 shows, partly in elevation and partly in section, a power press provided with a safety device, the latter being covered by a removable plate.

Referring now to FIG. 1, numeral 10 generally indicates the frame of a press which has a stationary bed 15 secured to vertical frame portions 16 and 17, and a movable tool holder 14 mounted for upward and downward movement on members 18 and 19.

The press is operated by rams 22 having ball-shaped heads 12 accommodated in hemi-spherical cavities of sockets 13 which are slidably mounted in guide members 11.

A plate 32 rests at the top of the guide members 11 and this plate is likewise shaped with a cavity for each ram head 12.

Inserted between the tool holder 14 and each of the ram arrangements is a safety device, the particulars of which are shown in FIGS. 2 and 3, or 4 and 5, respectively.

In the showing of FIG. 1, a plate 8 is fastened by screws 9 in front of the safety devices, which are thus hidden from view.

In FIGS. 2 and 3, two safety devices are shown which are of the known type comprising a breakable plate. The ram arrangements are the same as illustrated in FIG. 1 and described with reference thereto. Each safety device comprises a plurality of elements forming a unit, which is interposed between socket member 13 and the tool holder 14. The unit consists of a shearing plate 25 in abutment with socket 13, resting on a breakable safety plate 24, which in turn is supported by a bottom plate 26. Rails 27 are rigidly secured to tool holder 14 in which the bottom plate 26 is slidable so as to be easily moved into position below the socket 13, when it carries a safety unit with the plate 24 intact, and out of position after the plate has been broken, as it will be the case upon overload occurring in the press. In that case, a slight knocking will become noticeable, which indicates that the plate has been broken and that there is too much play between the cover plate 32 and the socket member 13. A replacement will then have to be made and this will be done in the following manner: Plate 8 which covers the parts of the safety device at the front is removed by loosening the screws 9; after plate 8 is taken off, the safety unit is taken out as a whole by sliding plate 26 in rails 27. A new unit is then slid in on rails 27 and the cover plate 8 placed back on.

However, while the replacement is easy in itself, it involves interruption of the operation of the press and is thus time consuming. It also is expensive, since a broken plate cannot be used again.

Referring now to FIGS. 4 and 5, the same ram arrangement is shown as the one in FIGS. 1, 2 and 3. The safety device, however, is the novel device in accordance with the invention.

Each safety device includes a high-pressure cylinder 35 and a piston 36 reciprocable therein. The cylinder has a bottom plate 37 which fits into and is slidable within rails 27 on tool holder 14, which are identical with those shown in FIG. 2. The piston 36 has a top parallel to plate 37 and bearing against the bottom of the socket member 13.

The two cylinders 35 are connected with each other by a line 47 which leads to a supply tank 43 by way of an adjustable safety valve 41.

Oil contained in the tank 43 can be withdrawn from the latter by means of a pump 46, which discharges the oil by way of a check valve 45 into line 47 and from there back to cylinder 35.

Preferably, a manometer 42 is arranged in line 47 for observing the pressure in the oil cylinders 35.

In operation, the pressure in the cylinders 35 is adjusted by means of valve 41; variations of pressure are adjustable by the valve, too. The pressure for which the safety device is set, may be read on the manometer 42. Pretensioning for regulating the flexibility of the operation of the press is also taken care of by valve 41.

When the ram meets an obstacle the resistance of which is higher than the adjusted operating pressure, the connecting rod of the press will force the sockets 13 down and this, in turn, will move the pistons in cylinders 35; as pressure rises in the cylinders, valve 41 opens so that oil will be allowed to pass through line 47 to tank 43. In this manner, it is brought about that between members 13 and 32 a larger clearance will obtain, which is detected by a knocking sound. The ram of the press will be left temporarily in its arrested position until it is taken along upwardy by the connecting rod of the press.

After the safety device has thus become operative, the pump 46 will be operated to return the oil, previously delivered into the supply tank, to cylinders 35, and the safety device is then ready for renewed use.

The pump may be either operated manually or electrically.

The hydraulic safety device protecting the press against overload permits to adjust the press for varying conditions and to make it resilient particularly in starting the operation. For instance, when a drawing operation is about to begin the sheet to be shaped is subjected to the highest strain at the time when the upper die descends thereon. Therefore, the safey device is so set that the operating pressure will rise slowly at the start of the drawing operation. In this manner, the reduction in cross section of the sheet is brought about gradually and the full possibility of a deep-drawing process may be utilized.

In punching operations, too, the variations in thickness of sheets can be balanced by the accurate adjustment of the safety valve.

It is the most important feature of the present invention that the unitary device composed of several hydraulic elements, can be used for insertion into many of the existing power presses, without change in their construction or design. The device avoids the disadvantages of both groups of known safety devices described above. It is wear-resistant, reliable in use, and easily re-set for service; it is a unit that is in its function completely independent from the design of the press to which it is applied.

If desired, the device may be used to replace the breakable plates previously used as safety devices in power presses without any change becoming necessary in said presses by the replacement.

I have described a preferred embodiment of my invention, but it is understood that this disclosure is for the purpose of illustration, and that various changes in shape and proportion, as well as the substitution of equivalent elements for those herein shown and described may be made without departing from the spirit and scope of the invention as set forth in the appended claims.

What is claimed is:

1. In a high power press of the type having a stationary bed, a movable tool holder slidably mounted for movement toward and away from said bed, and reciprocable driving means for actuating the tool holder, a safety device forming a hydraulically operable unit comprising a high pressure cylinder closed at one end and having a plate attached to said end, a piston slidably mounted in said cylinder, hydraulic fluid in said cylinder between the closed end thereof and the piston, said piston having a parallel top surface opposed to the plate on said cylinder, rails on said tool holder of the press for engagement with said plate, wherein said plate is slidable into and out of position below said reciprocating driving means for the tool holder, thereby making said unit exchangeable as a whole and useable for any desired number of presses without said presses having to undergo structural changes.

2. A safety device for high power presses of the type having a fixed bed, a tool holder slidably mounted for movement towards and away from the bed, and a reciprocatory drive member for actuating said slidably mounted tool holder, said safety device including a high pressure cylinder closed at one end and having a quadrangular plate attached to said end, a piston slidably mounted in said cylinder, hydraulic fluid in said cylinder between the closed end thereof and the inner end of the piston, a hydraulic fluid storage tank and a conduit with an overflow valve therein operative to allow passage of hydraulic fluid from said cylinder to said tank upon the occurrence of an excess pressure in said cylinder, said safety device comprising two mutually opposed parallel surfaces, one forming the plate attached to the bottom end of said cylinder and the other one forming the top end of said piston, and said tool holder having rails on top for engagement with said plate whereby the safety device can readily be exchanged as a whole and applied to a number of presses by insertion between the reciprocatory drive member and the slidably mounted tool holder, without said presses having to undergo any structural changes.

3. The safety device as claimed in claim 2, wherein a pump and conduit means are provided for forcing hydraulic fluid back from said tank into said cylinder for resetting the safety device for renewed service.

References Cited in the file of this patent

UNITED STATES PATENTS 905,601   Sperber ------------------ Dec. 1, 1908

FOREIGN PATENTS 614,154   Germany --------------- June 3, 1935

OTHER REFERENCES

Ser. No. 362,519½, W. Schmitt (A.P.C.), published May 11, 1943.